Patented Sept. 30, 1941

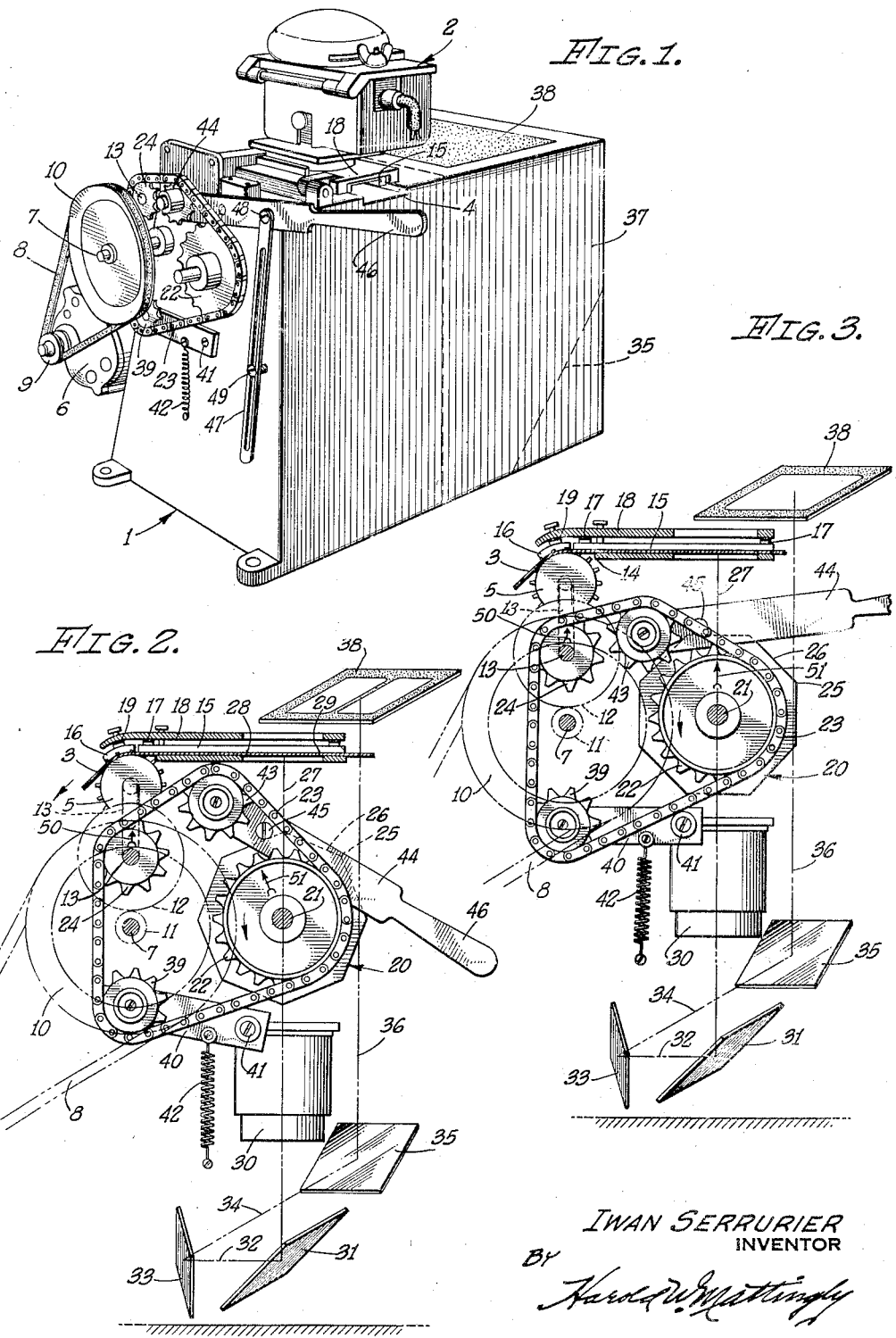

2,257,197

UNITED STATES PATENT OFFICE 2,257,197

MOTION PICTURE APPARATUS

Iwan Serrurier, Los Angeles, Calif.

Application April 30, 1940, Serial No. 332,487

2 Claims. (Cl. 88—16.8)

My invention relates to a motion picture apparatus and has particular reference to a framing device for use on motion picture projectors of the type employing a continuous film feed.

Motion picture projectors of the type to which this invention is particularly directed employ a film feeding sprocket which is rotated so as to pull the film through the projector and move each of the pictures or frames of the film continuously past the optical axis of the projector. These projectors employ a light controlling means, such as a rotating refractor, which is moved in synchronism with the film feeding sprocket so as to cause a movement of the projected image relative to the film opposite in direction to the movement of the film relative to the optical axis of the projector to thus cause each image to remain practically stationary on the projection screen. The refractor or light controlling means operates to cause the projected image of one frame to be progressively replaced or "wiped off" the screen by the projected image of the next frame, this replacement occurring once for each frame projected so that the persistence of vision of an observer will provide the usual illusion achieved by motion pictures.

In order to properly achieve this illusion it is necessary that each of the projected images be registered with the screen, otherwise the line of demarcation between adjacent frames will appear on the screen, a condition known as "out of frame." This condition may be corrected by altering the position of the light controlling means relative to the film to shift the projected image on the screen until one full frame is properly centered or located on the screen.

The operation of so adjusting the relation between the film position and the light controlling means to cause the projection upon the screen of only a single picture is known as "framing." In the present day motion picture projecting devices of the type to which this invention is directed, the synchronizing of the light controlling means with the film feeding sprocket is obtained by a positive interconnection, such as gears, chains, and the like and the framing is ordinarily accomplished by means of a roller mounted in a position to engage the film between the film feeding sprocket and the light controlling means so that movement of the roller operates to change the length of film included between these elements and thus shift the film relative to the light controlling means. In projectors of the film editing type it is highly desirable to provide for both forward and reverse operation of the projector and such operation is prevented by the use of this latter type of framing device for the reason that the film buckles whenever the projector is reversed and operated in such direction as to attempt to push the film past the optical axis of the projector.

It is accordingly an object of my invention to provide a motion picture projection apparatus embodying a framing device which is simple and inexpensive to construct and which will not readily get out of order.

It is another object of my invention to provide a framing device for use on a continuous feed projector of the reversible type.

It is also an object of my invention to provide an apparatus of the character set forth in the preceding paragraph which is capable of adjustment during the operation of the projector.

It is a still further object of my invention to provide a device of the character set forth which performs the registering or synchronizing operation by changing the relative angular positions of the film feeding sprocket and the rotary light controlling device.

It is an additional object of my invention to provide an apparatus of the character set forth hereinbefore in which the framing operation is accomplished without altering the length of the film between the film feeding sprocket and the optical axis of the projector.

Other objects and advantages of my invention will be apparent from a study of the following specifications, read in connection with the accompanying drawing, wherein:

Fig. 1 is a perspective view of a common form of motion picture projection apparatus of the film editing type embodying one form of framing device of my invention;

Fig. 2 is a diagrammatic representation of the apparatus illustrated in Fig. 1 illustrating in elevation the driving relationship between the film feeding sprocket and the rotary light controlling device and illustrating by diagrammatic means the manner in which the light is projected through the film; and Fig. 3 is a view similar to Fig. 2 but illustrating the framing device of my invention as occupying a different position and thus showing the manner in which the framing device operates to establish the proper registry.

Referring to the drawing, I have illustrated in Fig. 1 a well known form of film editing projector which may include a housing 1 adapted to rest upon a table or other supporting surface. The housing 1 carries at its upper end a lamp housing 2 within which is included a suitable source of illumination and the necessary condensing lenses for projecting the light from the light source downwardly through a motion picture film 3 which may be moved across the optical axis of the projector along a film guiding track 4. Movement of the film along the track 4 is accomplished by means of a film feeding sprocket 5 adapted to be rotated as by an electric motor 6 which may be drivably connected with a countershaft 7 by means of a belt 8 and pulleys 9 and 10. The countershaft 7 may be connected by means of gears 11 and 12 to a sprocket shaft 13 to which is affixed the film feeding sprocket 5.

Reversible operation of the projector is achieved by reversing the direction of rotation of the film feeding sprocket 5 either by reversing the direction of rotation of the motor 6 or by interposing a suitable reversing device between the motor 6 and the sprocket shaft 13. Buckling of the film at the time the sprocket 5 is rotated in such direction as to push the film along the track 4 may be prevented by extending the plate member which defines the track 4 into close proximity to the sprocket 5 as indicated at 14 (see Fig. 3) and by employing a pressure plate 15, 16 of such type as to resiliently but securely hold the film against the track plate member and the sprocket 5. The pressure plate portion 15 is adapted to be urged into engagement with the film 3 near the edges thereof as by means of springs 17 interposed between the pressure plate 15 and an upper gate member 18. The pressure plate portion 16 is preferably curved to conform to the curvature of the sprocket 5 and chanelled to permit the ready passage of the sprocket teeth. The member 16 may also be urged into contact with the film 3 by means of springs 19 interposed between the member 16 and the upper gate member 18.

In order that a rotary light controlling means, illustrated herein as comprising an octagonal refractor 20, may be synchronously driven with respect to the film feeding sprocket 5, I mount the rotary light controlling device 20 upon a shaft 21 which carries on its outer end a driven element or a chain sprocket 22, the chain sprocket 22 being drivably connected as by means of a non-extensible tension loop or endless chain 23 to a driven element which may comprise another chain sprocket 24 which is affixed to the outermost end of the sprocket shaft 13.

It will be seen that the structure just described provides for the continuous feeding of the film 3 past the optical axis of the projector in either direction and for the simultaneous uniform rotation of the light controlling device 20 in a direction corresponding to the direction of the feed of the film.

While I have shown the power for rotating the sprocket 5 and the device 20 as being applied to the shaft 13, it will be readily understood that it may instead be applied to the shaft 21 or to another sprocket separate from these shafts but drivably engaged with the chain loop 23.

In order that the picture will be properly projected, it is necessary that an edge 25 defined by angularly disposed plane surfaces 26 of the refractor 20 be disposed on the optical axis of the projector at the time that a line of demarcation between adjacent pictures on the film 3 is likewise aligned with the optical axis of the projector. When such a condition does not obtain, the film is said to be out-of-frame and the resulting projected motion picture comprises the upper portion of one picture disposed below the lower portion of the next adjacent picture. Such an out-of-frame condition is illustrated in Fig. 2 wherein the optical axis is represented by the dashed line 27 as passing through the center of one picture carried by the motion picture film 3, the lines of demarcation between this one picture and the next adjacent pictures being indicated by the lines 28 and 29.

Light from the lamp housing 2 is projected through the film 3 along the optical axis 27, through an objective lens 30 to an angularly disposed mirror 31 which operates to deflect the beam of light horizontally and longitudinally of the housing 1 along the line 32. A second angularly disposed mirror 33 is interposed for the purpose of directing the beam of light horizontally and outwardly from the housing 1 as along the line 34 to cause it to strike a third angularly disposed mirror 35 which functions to turn the beam vertically along side of the housing 1 as is indicated by the dashed line 36. The line of projection 36 may be enclosed by a supplemental housing 37 within which is fixed the mirror 35 and which is provided on its horizontal upper surface with a viewing screen 38, it being understood that the focus and location of the objective lens 30 is such as to cause an in-focus image to be projected upon the screen 38.

Two of the three mirrors 31, 33 and 35 are employed for obtaining the double reflection necessary to project the image upon the screen 38, while the third is employed to invert the image and cause it to be projected on the screen in its normal aspect.

I have indicated in Fig. 2 the manner in which an out-of-frame picture appears upon projection, including in the center of the viewing screen the images of the lines of demarcation, such as lines 28 and 29. This out-of-frame condition may be corrected by rotating the rotatable light controlling means 20 relative to the film feeding sprocket 5 a sufficient amount to properly dispose the refractor edge 25. This may be accomplished by providing a mechanism such as that illustrated in Fig. 2 wherein the chain 23 is illustrated as having a peripheral length considerably greater than that required to merely encircle the chain sprockets 22 and 24, the additional slack in the chain being taken up by means of an idler sprocket 39 which may be engaged with one side of the chain 23 as by mounting it on an arm 40 pivotally supported upon the housing 1 as by means of a pivot 41, the sprocket 39 being urged downwardly or in a tightening direction by means of a tension spring 42. Similarly, another idler sprocket 43 may be mounted in such a position to engage the other side of the chain 23 as by mounting it upon an arm 44 which is pivotally secured to the housing 1 as by means of a pivot 45.

The arm 44 preferably is formed with an extension forming a handle 46 so that the position of the idler sprocket 43 may be manually controlled. The arm 44 may be held in any adjusted position by friction as by providing a slotted link 47 pivotally connected to the arm 44 as at 48 and frictionally engaged with the housing 1 as indicated at 49. It will be observed that pivotal movement of the lever 44 will cause the length of chain which is extended between the film feeding drive sprocket 24 and the chain sprocket 22 to be varied, such variation being permitted by the other idler sprocket 39. It will also be further observed that the relative angular positions of the film feeding sprocket 5 and the rotary light controlling means 20 is determined by the relative lengths of chain which are interposed between the drive sprockets for these members on each side of the chain loop.

I have shown in Fig. 3 the manner in which the out-of-frame condition illustrated in Fig. 2 may be corrected by moving the lever 44 in a counterclockwise direction so as to include a shorter length of chain on the upper side between the two sprockets 24 and 22. I have also indicated in Figs. 2 and 3, by means of arrows 50 and 51, the relationship between the angular positions of these two members in the in-frame and out-of-frame positions.

It will be observed that the device above described will operate to frame the picture irrespective of the direction in which the projector is operated for the reason that the spring 42 acts through the idler 39 to maintain the chain 23 taut at all times so that the relative angular positions of the film sprocket 5 and the light controlling means 20 are controlled solely by the position in which the framing idler 43 is placed.

It will also be readily understood that while I have described the framing idler 43 and the spring urged idler 39 as comprising sprockets rollers or other similar devices may be used with equally advantageous results.

Attention is called to the fact that this structure is so constructed as to permit the framing of the picture during the time the projector is in operation and that it is of simple construction so that it may be manufactured readily and operated over long periods of time without causing any trouble.

From the foregoing it will be observed that I have provided a framing device which is particularly adapted for use on inexpensive projectors of the film editing type and that such framing device overcomes the disadvantages which inherently reside in framing devices previously employed for this purpose and that such framing device may be used with projectors of the reversible type.

While I have shown and described the preferred embodiment of my invention, I do not desire to be limited to any of the details of construction shown or described herein, except as defined in the appended claims.

I claim:

1. In combination with a motion picture projector including a film feeding sprocket mounted for rotation upon a shaft, a rotary light controlling means mounted for rotation upon another shaft, a driving sprocket on one of said shafts, a driven sprocket on the other of said shafts, and a drive mechanism comprising a chain loop encircling said driving and driven sprockets for synchronously rotating said film feeding sprocket and said light controlling means, a framing mechanism including: a framing sprocket engaged with one side of said chain loop; means mounting said framing sprocket for movement in a plane perpendicular to the axes of said shafts; an idler engaged with the other side of said chain loop; spring means normally urging said idler in a direction to take up slack in said loop; and manual means for so moving said framing sprocket, whereby said film feeding sprocket and said light controlling means are rotated relative to each other.

2. In combination with a motion picture projector including a film feeding sprocket mounted for rotation upon a shaft, a rotary light controlling means mounted for rotation upon another shaft, a driving sprocket on one of said shafts, a driven sprocket on the other of said shafts, and a drive mechanism comprising a chain loop encircling said driving and driven sprockets for synchronously rotating said film feeding sprocket and said light controlling means, a framing mechanism including: a framing sprocket engaged with one side of said chain loop; means mounting said framing sprocket for movement in a plane perpendicular to the axes of said shafts; an idler engaged with the other side of said loop; spring means normally urging said idler in a direction to take up slack in said loop; manual means for so moving said framing sprocket, whereby said film feeding sprocket and said light controlling means are rotated relative to each other; and friction means engaging said manual means for resisting the movement of said framing sprocket away from any position in which it may be placed.

IWAN SERRURIER.